(12) United States Patent
Sterle

(10) Patent No.: US 11,718,026 B1
(45) Date of Patent: Aug. 8, 2023

(54) RECOAT ASSEMBLIES FOR ADDITIVE MANUFACTURING SYSTEMS AND METHODS OF USING THE SAME

(71) Applicant: General Electric Company, Schenectady, NY (US)

(72) Inventor: John Sterle, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/869,472

(22) Filed: Jul. 20, 2022

(51) Int. Cl.
| | | |
|---|---|---|
| B29C 64/218 | (2017.01) |
| B29C 64/153 | (2017.01) |
| B33Y 30/00 | (2015.01) |
| B29C 64/241 | (2017.01) |
| B29C 64/236 | (2017.01) |

(52) U.S. Cl.
CPC .......... *B29C 64/218* (2017.08); *B29C 64/153* (2017.08); *B29C 64/236* (2017.08); *B29C 64/241* (2017.08); *B33Y 30/00* (2014.12)

(58) Field of Classification Search
CPC .................................................. B29C 64/153
See application file for complete search history.

(56) References Cited

U.S. PATENT DOCUMENTS

| | | | |
|---|---|---|---|
| 10,328,632 B2* | 6/2019 | Ruiz | B29C 64/393 |
| 10,695,981 B2 | 6/2020 | Hchsmann et al. | |
| 10,974,474 B2* | 4/2021 | Crear | B33Y 30/00 |
| 11,167,454 B2 | 11/2021 | Rockstroh et al. | |
| 2006/0219163 A1 | 10/2006 | Merot et al. | |
| 2019/0358901 A1 | 11/2019 | Dugan | |
| 2020/0298474 A1 | 9/2020 | Gimenez et al. | |

FOREIGN PATENT DOCUMENTS

| | | | | |
|---|---|---|---|---|
| EP | 3475057 B1 | 8/2020 | | |
| EP | 3463817 B1 | 4/2021 | | |
| WO | 2020237143 A1 | 11/2020 | | |
| WO | 2020237144 A1 | 11/2020 | | |
| WO | WO-2020237142 A1 * | 11/2020 | | B22F 10/10 |
| WO | WO-2020237161 A1 * | 11/2020 | | B22F 10/10 |
| WO | 2022086868 A1 | 4/2022 | | |

* cited by examiner

*Primary Examiner* — Atul P. Khare
(74) *Attorney, Agent, or Firm* — Dinsmore & Shohl LLP

(57) ABSTRACT

A recoat assembly includes a first portion including a roller. The recoat assembly also includes a second portion pivotally coupled to the first portion and pivotable with respect to the first portion from a first position to a second position. The roller is enclosed in a powder containment section when the second portion is in the first position, and the roller is exposed when the second portion is in the second position

20 Claims, 8 Drawing Sheets

RECOAT ASSEMBLIES FOR ADDITIVE MANUFACTURING SYSTEMS AND METHODS OF USING THE SAME

FIELD

The present disclosure relates to additive manufacturing components, and more specifically, recoat assemblies for additive manufacturing systems and methods of using the same.

BACKGROUND

In additive manufacturing processes, recoat assemblies may be used to smooth or distribute powder across a build area, for instance. As build material or powder is aerosolized throughout a build process, the powder and other contaminants may deposit on the surface of the roller, contaminating the roller and reducing its efficiency in smoothing powder in subsequent passes over a build area.

DETAILED DESCRIPTION

Figure 1:
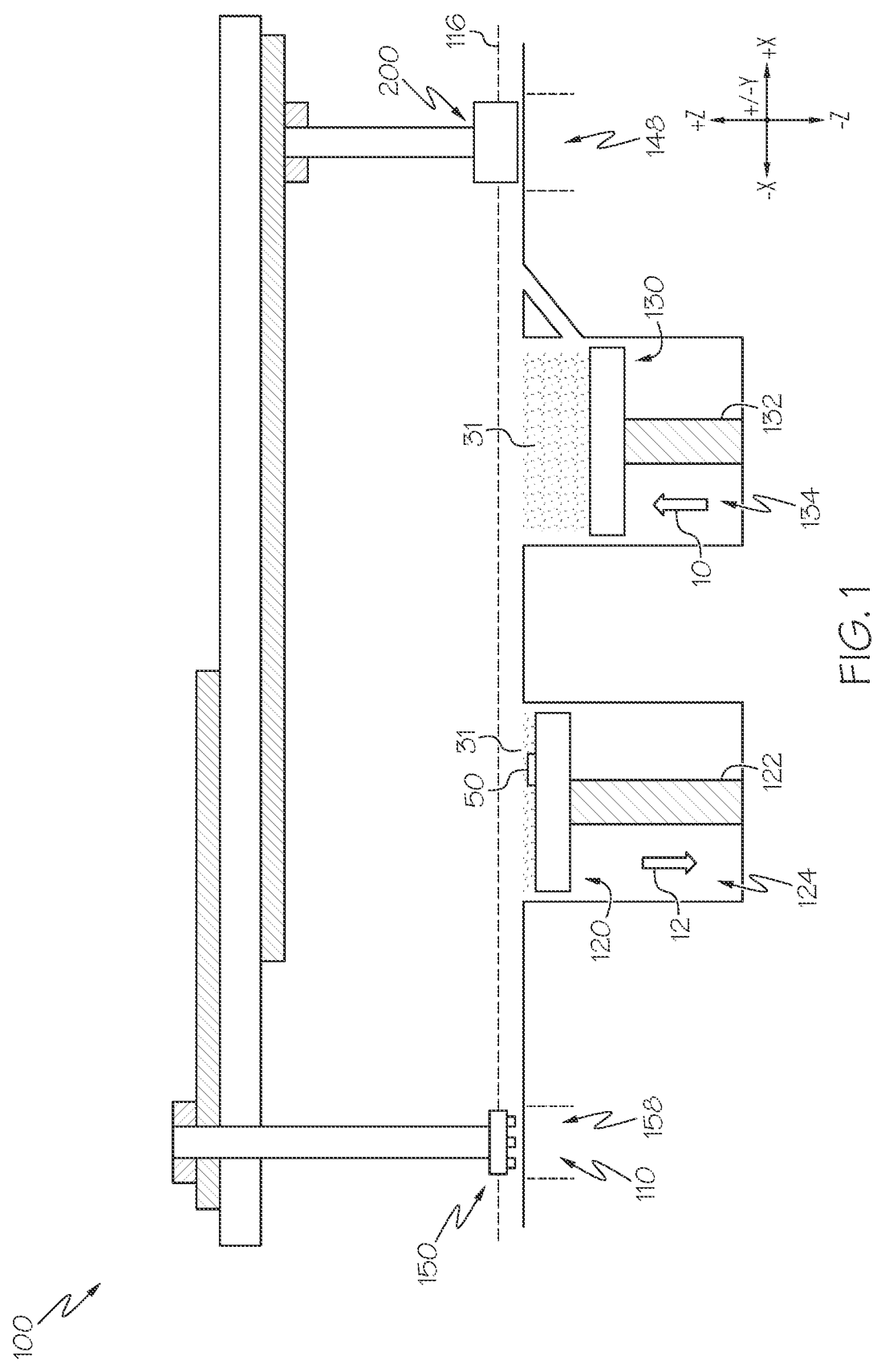
FIG. 1 schematically depicts an illustrative additive manufacturing system according to one or more embodiments shown and described herein.

The present disclosure relates to recoat assemblies for additive manufacturing systems and methods of using the same. Rollers of recoat assemblies may become contaminated with depositions of build material or powder. Therefore, it may be necessary to be able to visually and/or physically access the rollers of recoat assemblies to identify and/or replace a contaminated roller. Current recoat assemblies include fully exposed rollers. Fully exposed rollers may be visually accessible at all times during a build process. However, in being fully exposed, the remainder of the manufacturing apparatus becomes frequently contaminated with aerosolized powder depositions. Other current recoat assemblies may include enclosed rollers, that may contain aerosolized powder, but also include one or more parts that must be disassembled from the recoat assembly in order to visually or physically access the roller. Such recoat assemblies may greatly reduce overall build efficiency and require disturbing the inert environment of the build are to disassemble the recoat assembly. Other current recoat assemblies may include articulating recoat assemblies that may move or rotate in multiple axes to allow the roller to be visually accessed without disassembling the recoat assembly. However, such assemblies may feature reduced repeatability and accuracy throughout a build process, as the articulating nature of the recoat assembly in multiple axes reduces the structural stability of critical components of the recoat assembly, such as the roller.

Embodiments described herein address one or more of the above-noted shortcomings. Particularly, embodiments herein provide recoat assemblies having rollers located within a powder containment section to reduce powder contamination. To visually or physically access the roller, select portions of the recoat assembly are pivotable to expose the roller within the powder containment section. To enhance repeatability, critical components of the recoat assembly, such as the roller, are not pivotable. In addition, the critical components of the recoat assembly may only be movable along one coordinate axes, increasing stability and repeatability in build processes.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example, up, down, right, left, front, back, top, bottom—are made only with reference to the figures as drawn and are not intended to imply absolute orientation unless otherwise expressly stated.

The phrase "communicatively coupled" is used herein to describe the interconnectivity of various components and means that the components are connected either through wires, optical fibers, or wirelessly such that electrical, optical, and/or electromagnetic signals may be exchanged between the components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an additive manufacturing system 100 is schematically depicted. The additive manufacturing system 100 includes, but is not limited to, a supply platform 130, a build platform 120, a print assembly 150, a cleaning station 110, and a recoat assembly 200. The additive manufacturing system 100 may be arranged such that the build platform 120 is located proximate (e.g., next to) the supply platform 130 so that build feedstock (e.g., powder) can be delivered by the supply platform 130 to the build platform 120, as described herein.

The supply platform 130 is generally a surface that supports the build feedstock for the purposes of moving the feedstock to a location that is accessible by the recoat assembly 200 to move the feedstock to the build platform 120. Accordingly, the supply platform 130 is movable within a supply receptacle 134 to receive build feedstock from a first position (e.g., a supply origin position, a receiving position) to a second position (e.g., a position in an area that is reachable by the recoat assembly 200 to push the build feedstock to the build platform 120, a supply position). To affect such a movement of the supply platform 130, the supply platform may be coupled to a supply platform actuator 132. The supply platform actuator 132 is movable/actuatable in a vertical direction (e.g., the +/−Z direction of the coordinate axes depicted in FIG. 1) such that the supply platform 130 may be raised or lowered within the supply receptacle 134 (e.g., raised from the first position to the second position or lowered from the second position to the first position). As noted herein, the build platform 120 is located adjacent to the supply platform 130.

The build platform 120 generally provides a surface upon which an object is formed during an additive manufacturing process. As is generally understood, objects in additive manufacturing are formed by means of a successive layerwise deposition of feedstock material that is fused together using the print assembly 150. As such, to make room for each successive layer of material for fusing, the build platform 120 is movable within a build receptacle 124 to make room for each successive layer. To affect such a movement of the build platform 120, the build platform 120 may be coupled to a build platform actuator 122. The build platform actuator 122 is movable/actuatable in the vertical direction (e.g., the +/−Z direction of the coordinate axes depicted in FIG. 1) such that the build platform 120 is raised or lowered within the build receptacle 124.

The print assembly 150 is generally a device, system, component, or the like that contains elements for fusing build materials in the additive manufacturing system 100. That is, the print assembly 150 includes, but is not limited to, at least one binder deposition component that provides a layer of curable binder material. Various other components and functionality of the print assembly 150 should generally be understood and is not described in further detail herein. In some embodiments, the additive manufacturing system 100 may also include at least one light emitting component that emits light (e.g., a laser or the like) toward build materials and/or binder to cause fusing and/or curing of materials.

The recoat assembly 200 is generally a device, system, component, or the like that is movable within the additive manufacturing system 100 to push material between locations, to spread a layer of material across an area, to smooth a layer of material that has been spread, and/or the like. Additional details regarding the recoat assembly will be described herein.

In operation, build material 31 obtained from the build feedstock, such as organic or inorganic powder, is positioned on the supply platform 130 when the supply platform 130 is located at the first position (e.g., a receiving position). The supply platform 130 is moved from the first position to the second position (e.g., the supply position) by the supply platform actuator 132 to present a layer of the build material 31 in a movement path of the recoat assembly 200. The recoat assembly 200 is then actuated along a working axis 116 of the additive manufacturing system 100 towards the build platform 120. In some embodiments, the working axis 116 may be generally parallel to a horizontal axis (e.g., the +X/−X axis of the coordinate axes of FIG. 1). However, the present disclosure is not limited to such embodiments. As the recoat assembly 200 traverses the working axis 116 from a home region 148 over the supply platform 130 towards the build platform 120, the recoat assembly 200 distributes the layer of build material 31 in the path of the recoat assembly 200 from the supply platform 130 to the build platform 120 (e.g., pushes the layer of build material 31 from the supply platform 130 to the build platform 120, spreads the layer of build material 31, smooths the layer of build material 31, etc.).

Thereafter, the print assembly 150 moves along the working axis 116 over the build platform 120 and may deposit a layer of binder 50 in a predetermined pattern on the layer of build material 31 that has been distributed on the build platform 120. After the binder 50 is deposited, an energy source may be utilized to cure the deposited binder 50, as described in greater detail herein. The print assembly 150 can then move to a home position 158 where at least a portion of the print assembly 150 is positioned over the cleaning station 110. While the print assembly 150 is in the home position 158, the print assembly 150 works in conjunction with the cleaning station 110 to provide cleaning and maintenance operations on the elements of the print assembly 150 to ensure the elements are not fouled or otherwise clogged. This may assist in ensuring that the print assembly 150 is capable of depositing the binder 50 in the desired pattern during a subsequent deposition pass.

During this maintenance interval, the supply platform 130 is actuated in an upward vertical direction (e.g., towards the +Z direction of the coordinate axes depicted in the figure) as indicated by arrow 10 to present a new layer of build material 31 in the path of the recoat assembly 200. The build platform 120 is actuated in the downward vertical direction (e.g., in the −Z direction of the coordinate axes depicted in the figure) as indicated by arrow 12 to prepare the build platform 120 to receive a new layer of build material 31 from the supply platform 130. The recoat assembly 200 is then actuated along the working axis 116 of the additive manufacturing system 100 again to add another layer of build material 31 and binder 50 to the build platform 120. This sequence of steps is repeated a plurality of times to build an object on the build platform 120 in a layerwise manner.

While the embodiment depicted in FIG. 1 and described above describes the recoat assembly 200 and the print assembly 150 as being different components, it should be understood that recoat assembly 200 and the print assembly 150 may be included in a common assembly that is movable along the working axis 116. Further, while reference is made herein to additive manufacturing systems including a print assembly 150 that dispenses a binder 50, it should be understood that this is merely an example. For example, in some embodiments, instead of building objects with a curable binder 50 applied to the build material 31, in some embodiments, a laser or other energy source may be applied to the build material 31 to fuse the build material 31.

Figure 2:
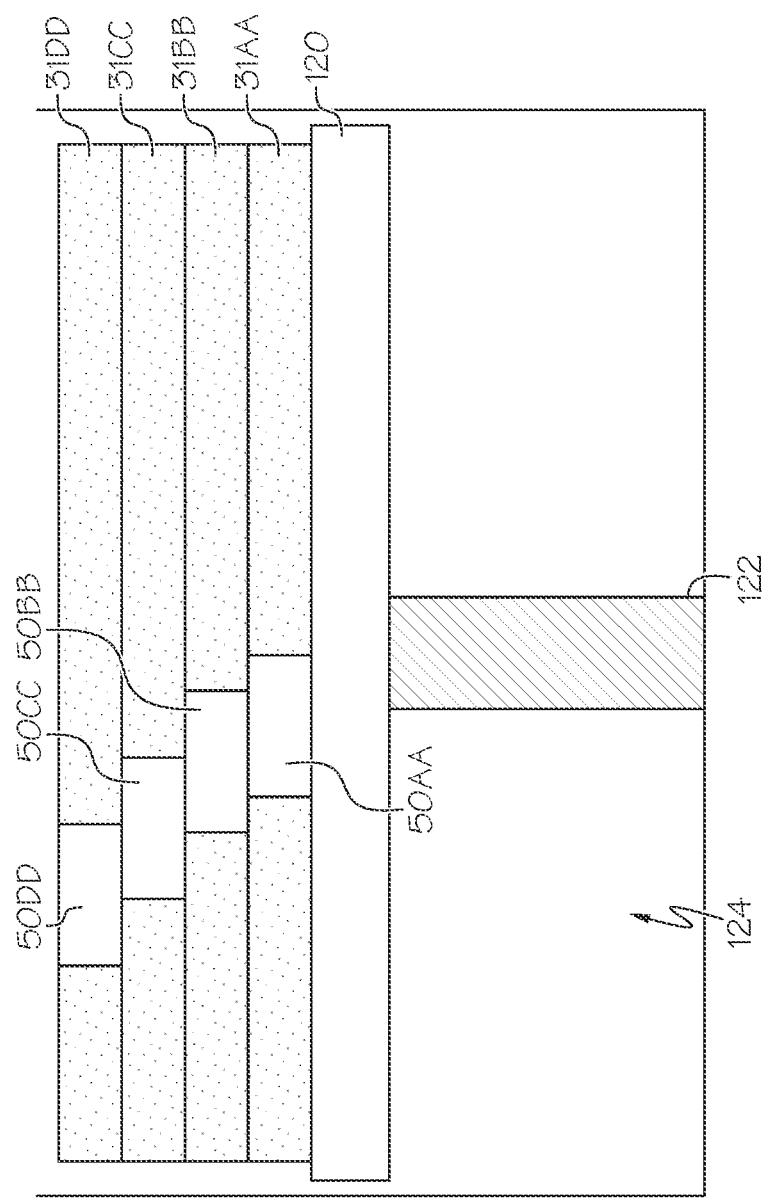
FIG. 2 schematically depicts an enlarged view of illustrative build material within the additive manufacturing system of FIG. 1.

Referring to FIG. 2, to form an object, layers of build material 31AA, 31BB, 31CC, 31DD may be sequentially positioned on top of one another. In the example provided in FIG. 2, sequential layers of binder 50AA-50CC are positioned on the layers of build material 31AA-31DD. By curing the layers of binder 50AA-50CC, a finished product may be formed.

Figure 3:
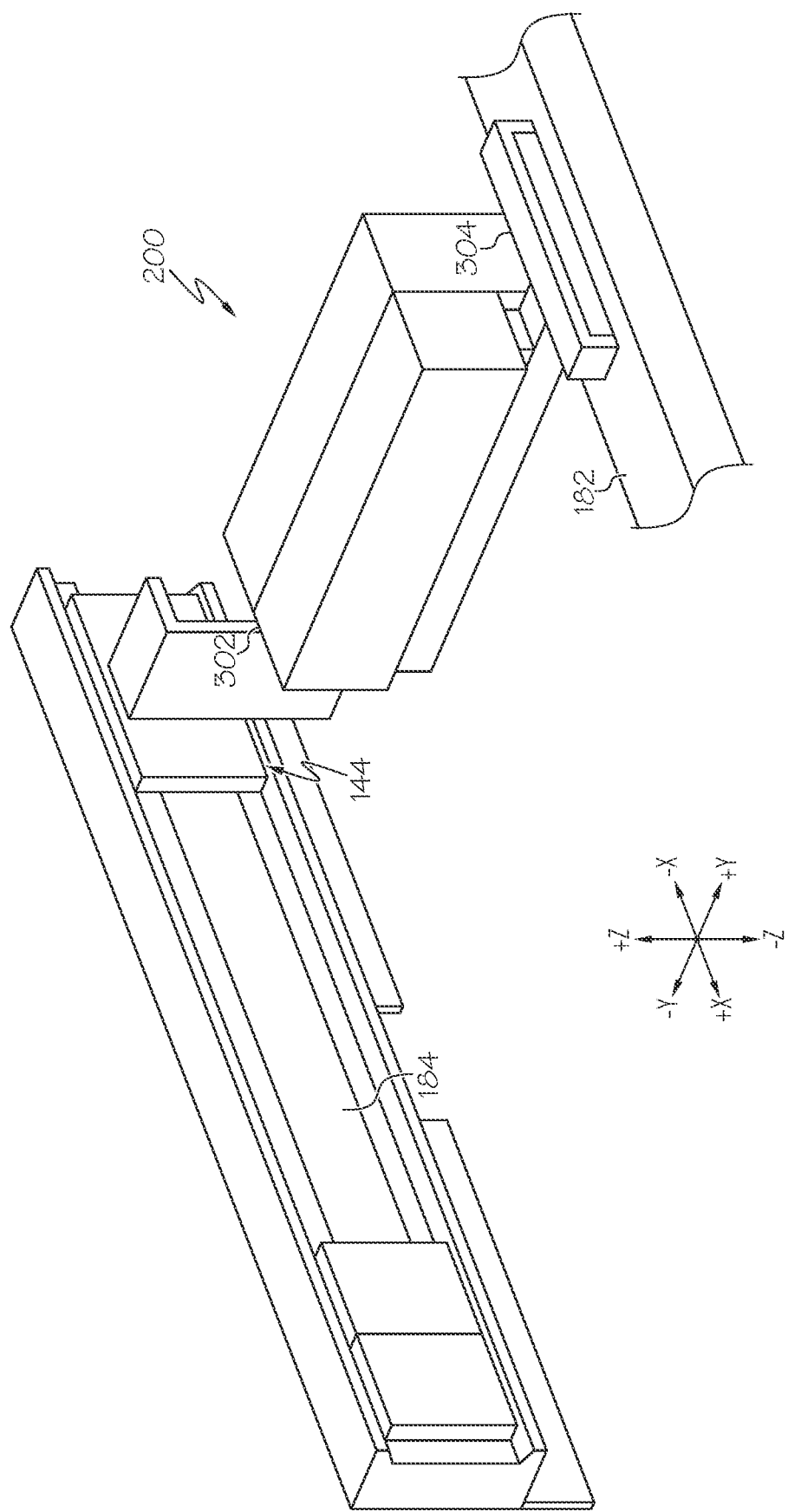
FIG. 3 schematically depicts a perspective view of an illustrative embodiment of a recoat assembly according to one or more embodiments shown and described herein.

Referring to FIG. 3, a perspective view of one embodiment of the recoat assembly 200 is schematically depicted. The recoat assembly 200, in embodiments, may include a transverse actuator 144 that moves the recoat assembly 200 in the lateral direction (e.g., in the +X/−X-direction as depicted in FIG. 3). Particularly, the transverse actuator 144 may be movably disposed within a first guide 184 of the additive manufacturing system 100 (FIG. 1) and coupled to a first lateral edge 302 of the recoat assembly 200. Accordingly, the transverse actuator can move the recoat assembly 200 in the lateral direction along the first guide 184. In some embodiments, the additive manufacturing system 100 (FIG. 1) may further include a second guide 182 extending substantially parallel to the first guide 184 and positioned opposite the first guide 184 across the supply platform 130 (FIG. 1) and the build platform 120 (FIG. 1). The recoat assembly 200 may be movably coupled to the second guide 182 along a second lateral edge 304 of the recoat assembly 200 such that the second lateral edge 304 slides along the second guide 182 when the recoat assembly 200 is moved via the transverse actuator 144. In some embodiments, the second lateral edge 304 may be retained within the second guide 182 such that the second lateral edge 304 slides within the second guide 182. In other embodiments, the second lateral edge 304 may be disposed on the second guide 182 so that the second lateral edge 304 moves overtop of the second guide 182.

Figure 4:
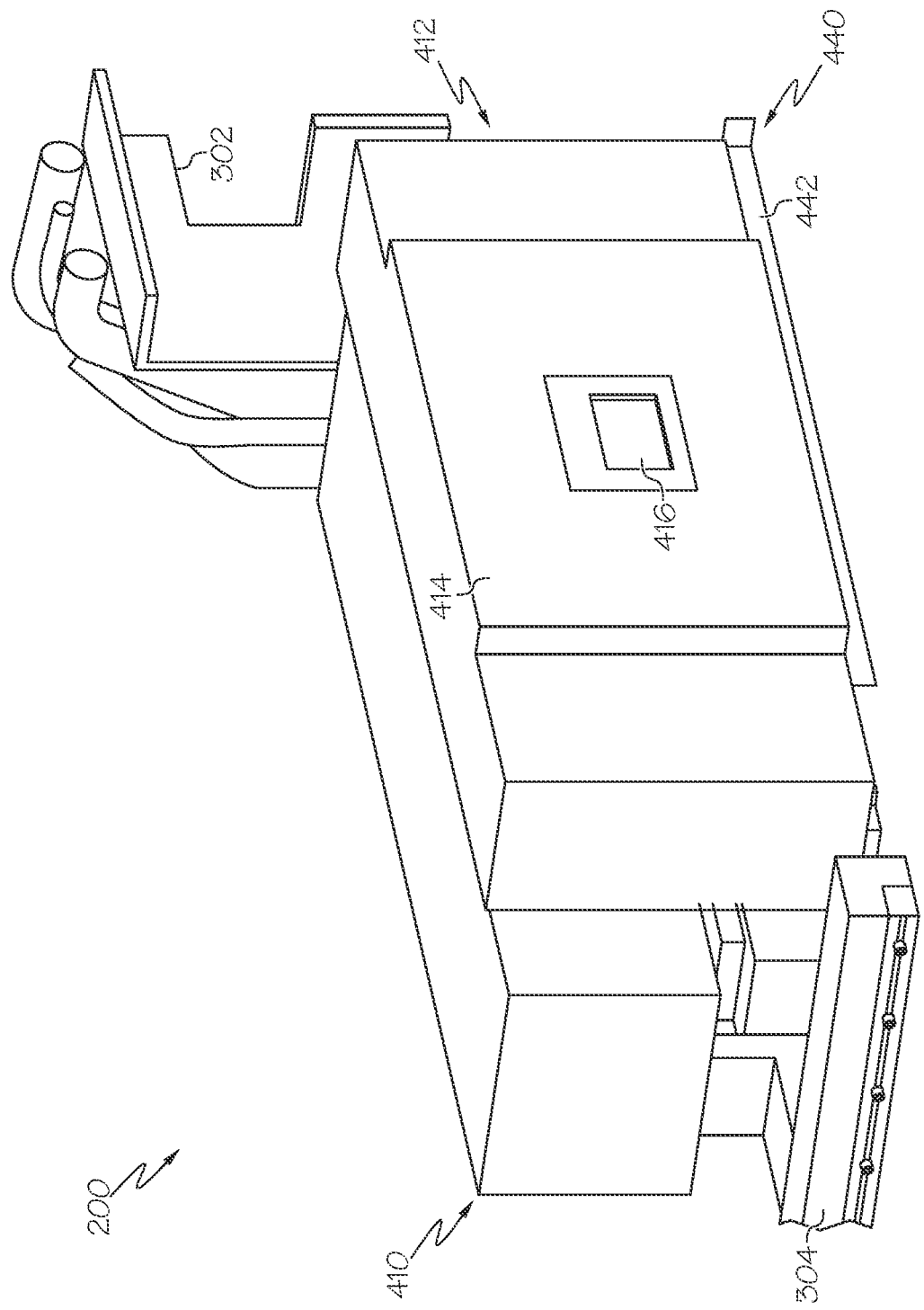
FIG. 4 schematically depicts a perspective view of an illustrative recoat assembly in a closed configuration according to one or more embodiments shown and described herein.
Figure 5:
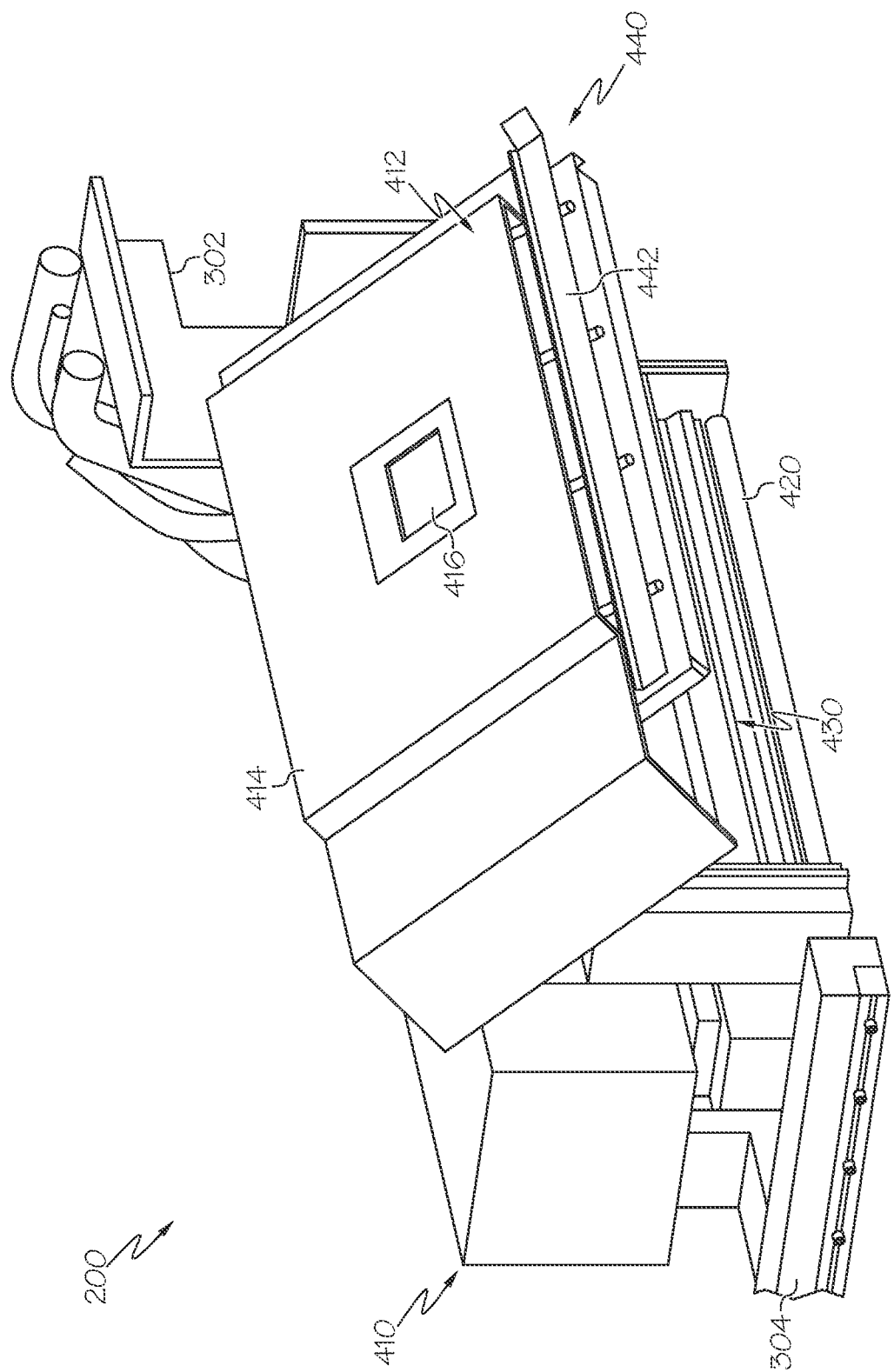
FIG. 5 schematically depicts a perspective view of the recoat assembly of FIG. 4 in an open configuration according to one or more embodiments shown and described herein.

Referring to FIGS. 4 and 5, perspective views of an embodiment of the recoat assembly 200 are depicted. More specifically, FIG. 4 depicts the recoat assembly 200 in a closed configuration, and FIG. 5 depicts the recoat assembly 200 in an open configuration. The recoat assembly 200 generally includes a first portion 410 and a second portion 412. The second portion 412 is pivotally coupled to the first portion 410 (e.g., via a hinge or the like (not depicted)). The second portion 412 is pivotable with respect to the first portion 410 from a first, closed position, depicted in FIG. 4, to a second, open position depicted in FIG. 5. In some embodiments, the first portion 410 of the recoat assembly may not be pivotable. As shown in FIG. 5, the first portion 410 of the recoat assembly 200 includes a roller 420 that rotates around a central roller axis to contact, move, spread, and/or smooth the build material 31 (FIG. 1) as described herein.

In some embodiments, the first portion 410 and/or the second portion 412 may be encasement portions that define one or more internal cavities. In some embodiments, at least one of the one or more internal cavities defined by the first portion 410 and/or the second portion 412 may contain the roller 420. Such encasement portions may define a barrier that contains materials (e.g., build material 31 (FIG. 1) within at least one of the one or more internal cavities and/or prevents or reduces an amount of environmental materials (e.g., airborne particulate matter) from contacting the roller 420 when the first portion 410 and the second portion 412 are arranged in the closed configuration shown in FIG. 4.

In embodiments, the second portion 412 of the recoat assembly 200 may include a shield 414. The shield 414 may be a component that shields at least one of the one or more internal cavities from an external environment and be constructed of any plastic, polymer, metal, and/or combinations thereof that provides shielding properties (e.g., shielding from airborne particles, shielding from temperatures that exceed a threshold, etc. The shield 414 may be integrated with the second portion 412 (e.g., constructed as at least a section of the second portion 412), or may be disposed on at least a section of the second portion 412. In embodiments, the shield 414 may be transparent, e.g., such that at least a portion of the one or more internal cavities can be viewed from a location outside the second portion 412 of the recoat assembly 200. In some embodiments, the shield 414 may include a handle 416 disposed on or integrated within an outer surface thereof to allow for manual manipulation of the shield 414, and the remainder of the second portion 412 of the recoat assembly, as will be discussed in greater detail below.

Still referring to FIGS. 4 and 5, the second portion 412 of the recoat assembly 200 may further include a powder plow assembly 440 in some embodiments. The powder plow assembly 440 may generally be a component that assists in moving excess build material 31 (FIG. 1) and/or debris positioned in or along the path of the recoat assembly 200 as the recoat assembly 200 moves along the working axis 116. The powder plow assembly 440 may include a powder plow 442, which may be formed from any suitable material with a wear resistant low coefficient of friction coating. As a non-limiting example, the powder plow 442 may be formed from electroless nickel with co-deposited polytetrafluoroethylene (PTFE) or may be electropolished. The powder plow assembly 440, including the powder plow 442, may be fixedly secured to, and extend from, a bottom edge of the shield 414.

Figure 6:
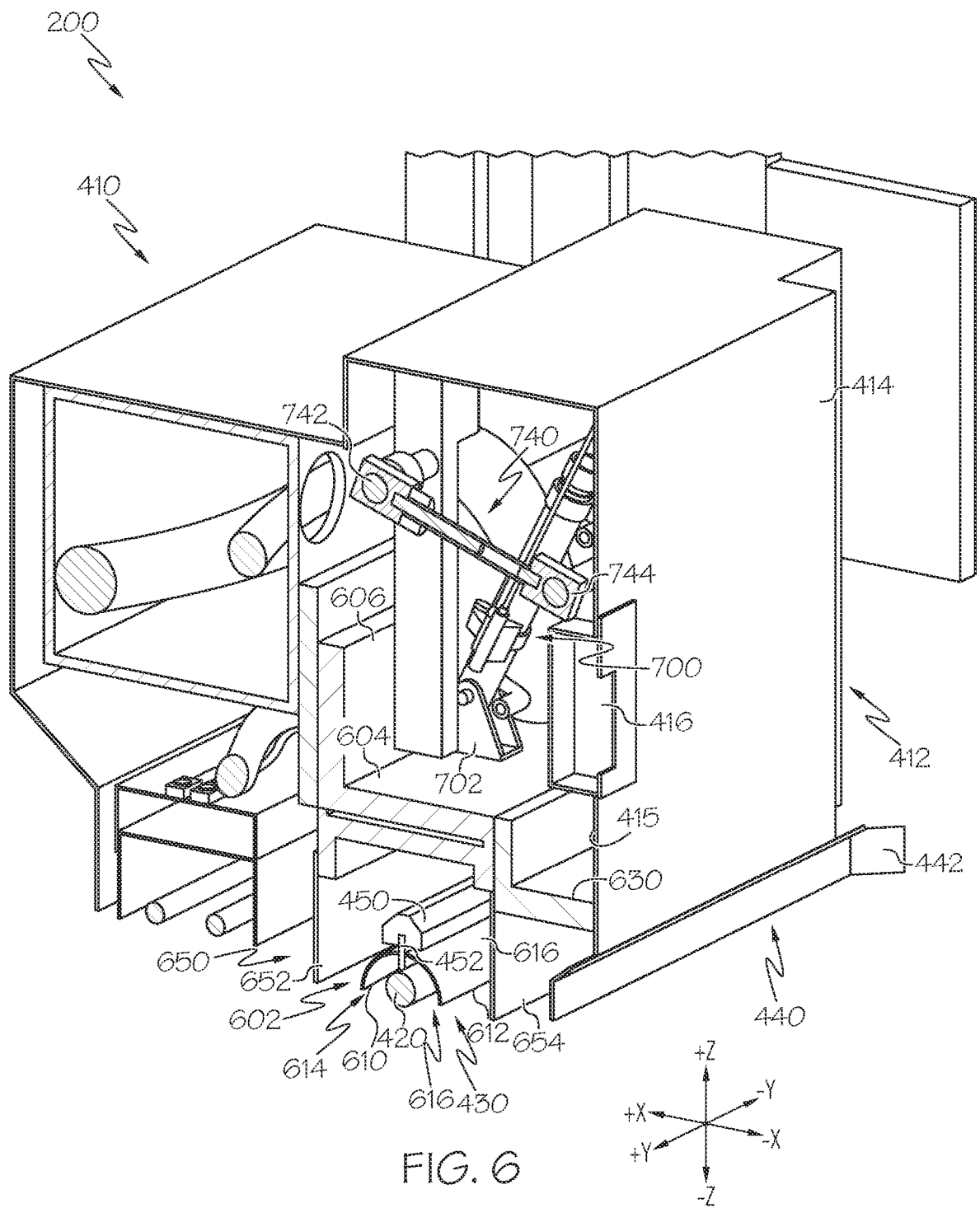
FIG. 6 schematically depicts a section view of a recoat assembly in a closed configuration according to one or more embodiments shown and described herein.
Figure 7:
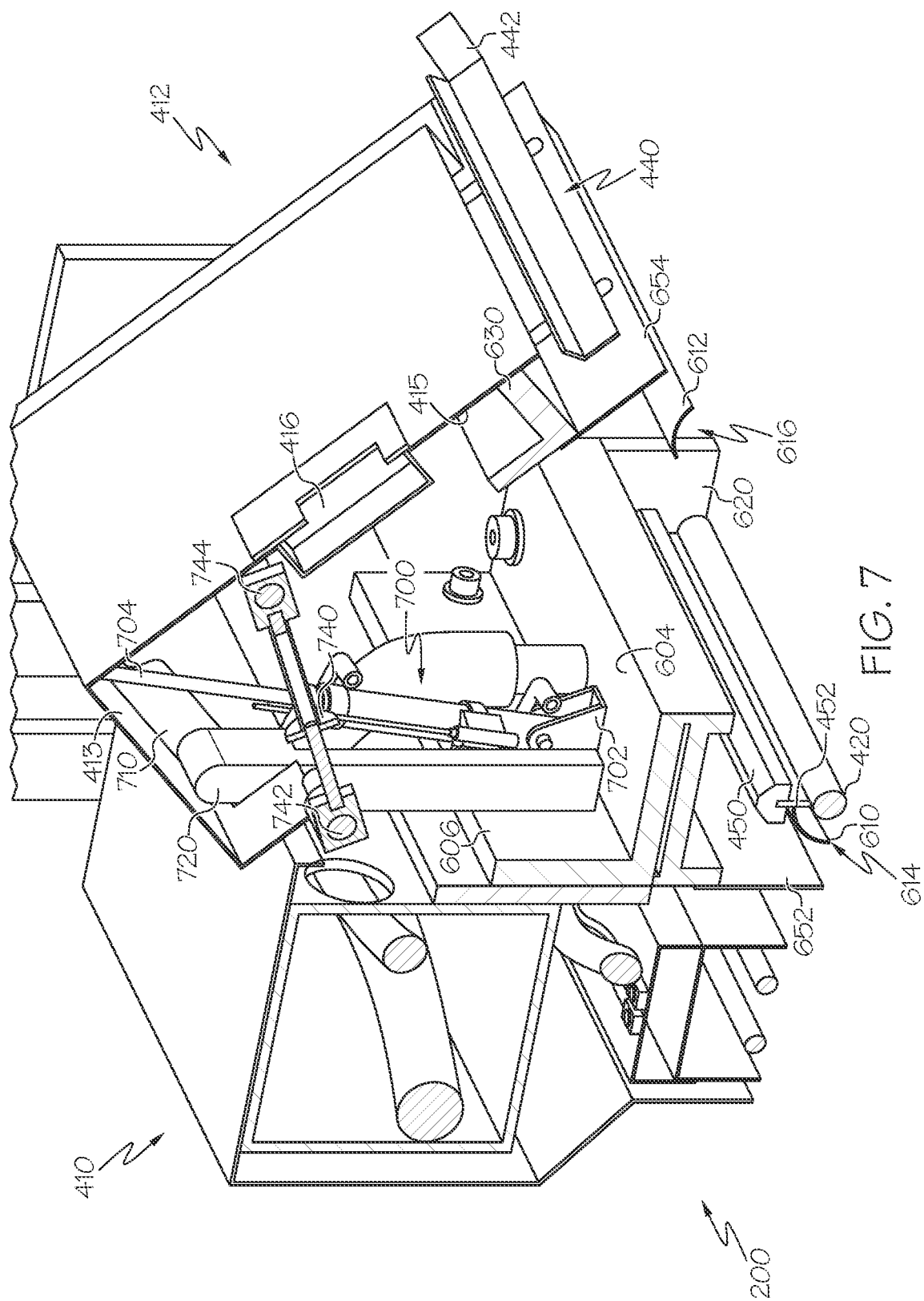
FIG. 7 schematically depicts a section view of the recoat assembly of FIG. 6 in an open configuration according to one or more embodiment shown and described herein.

As noted, the first portion 410 and/or the second portion 412 of the recoat assembly 200 may define one or more internal cavities therein. FIGS. 6 and 7 depict cross-sectional views of various internal cavities defined by the first portion 410 and/or the second portion 412 of the recoat assembly 200. More specifically, FIG. 6 depicts the recoat assembly 200 in the closed configuration, and FIG. 7 depicts the recoat assembly 200 in the open configuration.

As particularly depicted in FIGS. 6 and 7, the second portion 412 of the recoat assembly 200 may further include a base frame 630 extending a distance inward (e.g., in the +X direction of the coordinate axes of FIG. 6) from and coupled to an interior surface 415 of the shield 414. As shown in FIG. 6, the base frame 630 may extend from the interior surface 415 of the shield 414 in a direction toward the first portion 410 when the recoat assembly 200 is in the closed configuration. The base frame 630 of the second portion 412 provides a surface (e.g., a base surface, a shelf, or the like) or a support by which one or more other components may be coupled to or supported by the second portion 412 of the recoat assembly 200. In some embodiments, the base frame 630 may be a planar support or frame.

Still referring to FIGS. 6 and 7, in some embodiments, the first portion 410 of the recoat assembly 200 may include a first base frame 604 (e.g., a horizontal base frame) and/or a second base frame 606 (e.g., a vertical base frame). More specifically, the second base frame 606 may extend a distance downward (e.g., towards the −Z direction of the coordinate axes of FIG. 6) from the first portion 410, such as, for example, in a direction towards the roller 420. The first base frame 604 may extend a distance from the second base frame 606 (e.g., extend from a distal portion of the second base frame 606 in the −X direction of the coordinate axes of FIG. 6). In some embodiments, the first base frame 604 and the second base frame 606 may form an L-shape configuration. In some embodiments, the first base frame 604 and the second base frame 606 may be a single base frame having two sections that extend in different directions (e.g., a first portion extending in the −Z direction and a second portion extending in the −X direction of the coordinate axes of FIG. 6). The first base frame 604 and/or the second base frame 606 provides a surface (e.g., a base surface, a shelf, or the like) or a support by which one or more other components may be coupled to or supported by the first base frame 604 and/or the second base frame 606. In some embodiments, the first base frame 604 and/or the second base frame 606 may be planar supports or frames. In some embodiments, the first base frame 604 and/or the second base frame 606 generally provide one or more surfaces for attachment of various components of the recoat assembly 200 to the first portion 410 of the recoat assembly 200.

Still referring to FIGS. 6 and 7, the one or more cavities defined by the first portion 410 and the second portion 412 of the recoat assembly 200 may include a powder containment region 430 in some embodiments. The powder containment region 430 is generally an area defined by one or more components of the recoat assembly 200 that includes one or more powder shields or shrouds, such as, for example, an inner shroud 602 and/or an outer shroud 650. The inner shroud 602 may include a first shroud segment 610 and a second shroud segment 612 that surround at least a portion of the roller 420. The first shroud segment 610 may define a first end 614 of the inner shroud 602. The second shroud segment 612 may define a second end 616 of the inner shroud 602. The first end 614 of the inner shroud 602 and the second end 616 of the inner shroud 602 may be adjacent opposite sides of the roller 420, such that the inner shroud 602 at least partially surrounds the roller 420. In some embodiments, the first shroud segment 610 of the inner shroud 602 and the second shroud segment 612 of the inner shroud 602 may each be quarter spheres, such that when the recoat assembly 200 is in the closed configuration, the inner shroud 602 substantially forms a hemisphere around the roller 420, as can be seen in FIG. 6.

The first shroud segment 610 of the inner shroud 602 may be coupled to the first base frame 604 of the first portion 410 of the recoat assembly 200 by means of a shield hanger 620 (see FIG. 7) coupled to an underside of the first base frame 604. That is, the shield hanger 620 extends in a direction (e.g., vertically, in the −Z direction of the coordinate axes of FIG. 6) from the first base frame 604 to a location adjacent to the roller 420 such that the first shroud segment 610 coupled thereto is also located adjacent to the roller 420 as described herein. The second shroud segment 612 of the inner shroud 602 may be coupled to the base frame 630 of the second portion 412 of the recoat assembly 200, or one or more other surfaces of the second portion 412 of the recoat assembly, such that, when the second portion 412 is pivoted away from the first portion 410 to the open position as shown in FIG. 7, the second shroud segment 612 of the inner shroud 602 separates from the first shroud segment 610 of the inner shroud 602 to expose the roller 420.

Still referring to FIGS. 6-7, the powder containment region 430 may further include an outer shroud 650 encasing the inner shroud 602 and the roller 420. The outer shroud 650 may include, for example, a first outer shroud wall 652 nearest to the first end 614 of the inner shroud 602 and a second outer shroud wall 654 nearest to the second end 616 of the inner shroud 602 in some embodiments. The first outer shroud wall 652 may be coupled to an underside of the first base frame 604 of the first portion 410 of the recoat assembly 200 in some embodiments. The second outer shroud wall 654 may be coupled to an underside of the base frame 630 of the second portion 412 of the recoat assembly 200 in some embodiments. That is, the outer shroud walls 652, 654 extend in a direction (e.g., vertically, in the −Z direction of the coordinate axes of FIG. 6) from the first base frame 604 and the base frame 630, respectively. In some embodiments, the outer shroud walls 652, 654, together with the first base frame 604 and base frame 630, respectively, may substantially surround the inner shroud 602 and the roller 420 when the recoat assembly 200 is in the closed configuration as shown in FIG. 6 and may expose the roller 420 when in the open configuration as shown in FIG. 7. Further, in some embodiments, the various components of the outer shroud 650 may define the outer limits of the powder containment region 430.

Still referring to FIGS. 6-7, the first portion 410 of the recoat assembly 200 further includes a first powder blocker component 450 and a second powder blocker component 452. The first powder blocker component 450 and the second powder blocker component 452 may each be coupled to one or more components of the first portion 410 of the recoat assembly 200, such as the first base frame 604 and/or the second base frame 606. The first powder blocker component 450 and the second powder blocker component 452 may provide support for the roller 420 and/or further contain powder within the powder containment region 430. For example, the first powder blocker component 450 may extend laterally (e.g., in the +X/−X directions of the coordinate axes of FIG. 6) over the inner shroud 602 and the second powder blocker component 452 may extend downward (e.g., in the −Z direction of the coordinate axes of FIG. 6) between the first shroud segment 610 and the second shroud segment 612 of the inner shroud 602 such that the second powder blocker component 452 is compressed between the first shroud segment 610 and the second shroud segment 612 of the inner shroud 602 when the recoat assembly 200 is in the closed position as shown in FIG. 6. In some embodiments, the second powder blocker component 452 extends such that it contacts the roller 420 so that, as the roller 420 rolls, excess material clinging to the roller 420 is scraped off by the second powder blocker component 452.

Still referring to FIGS. 6-7, the recoat assembly 200 may include at least one pneumatic actuator 700. The pneumatic actuator 700 includes a base 702 that is fixedly coupled to a portion of the recoat assembly 200 to provide support for the pneumatic actuator 700. For example, the base 702 may be coupled to the first portion 410 of the recoat assembly 200, such as, for example, the first base frame 604 and/or the second base frame 606 of the first portion 410 of the recoat assembly 200. An actuatable head 704 (FIG. 7) of the pneumatic actuator 700 is coupled to the shield 414 of the second portion 412 of the recoat assembly 200 (e.g., the interior surface 415 of the shield 414). The head 704 of the pneumatic actuator 700 may particularly be coupled to the shield 414 at a junction between a horizontal support arm 710 (FIG. 7) extending across an upper interior wall 413 of the shield 414 and a vertical support arm (not shown) positioned along an interior surface of the interior surface 415 of the shield 414. The horizontal support arm 710 of the second portion 412 is pivotally coupled to a vertical support arm 720 of the first portion 410 of the recoat assembly 200. Therefore, as the pneumatic actuator 700 is actuated such that the head 704 extends away from the base 702, the head 704 applies an upward (e.g., in the +Z direction of the coordinate axes of FIG. 6) force on the horizontal support arm 710 of the second portion 412 toward the position of the interior surface 415 of the shield 414, the second portion 412, including the shield 414 and all components coupled thereto, rotate about the pivotable connection between the horizontal support arm 710 of the second portion 412 and the vertical support arm 720 of the first portion 410. Therefore, the shield 414, powder plow assembly 440, second outer shroud wall 654 of the outer shroud 650, and the second shroud segment 612 of the inner shroud 602 may pivot upwardly into a second position to expose the roller 420 from within with powder containment region 430, as shown in FIG. 7. In addition, various components of the recoat assembly 200, including the roller 420, first lateral edge 302, and second lateral edge 304 (FIGS. 3-5) remain stationary with respect to the second portion 412 as the roller 420 is exposed from within the powder containment region 430. The exposed roller 420 can be inspected without disturbing the position of the various components of the recoat assembly 200 coupled to the first portion 410, allowing for a build process to subsequently resume with stability and repeatability.

Still referring to FIGS. 6-7, in embodiments the recoat assembly 200 may include a lift assist arm 740. The lift assist arm 740 may be pivotally coupled to the first portion 410 of the recoat assembly 200 at a first end 742 of the lift assist arm 740. The lift assist arm 740 may further be pivotally coupled to the second portion 412 of the recoat assembly 200 at a second end 744 of the lift assist arm 740. The first end 742 of the lift assist arm 740 may be pivotally coupled to the vertical support arm 720 of the first portion 410 in some embodiments. The second end 744 of the lift assist arm 740 may be pivotally coupled to the vertical support arm (not shown) positioned along the interior surface 415 of the shield 414 in some embodiments. The lift assist arm 740 may include a spring biased to expand in length, thereby providing a biasing force that assists in transitioning the second portion 412 of the recoat assembly 200 from the closed configuration to the open configuration. Actuation of the pneumatic actuator 700 may overcome the bias of the lift assist arm 740 to maintain the second portion 412 in the closed configuration when desired.

Figure 8:
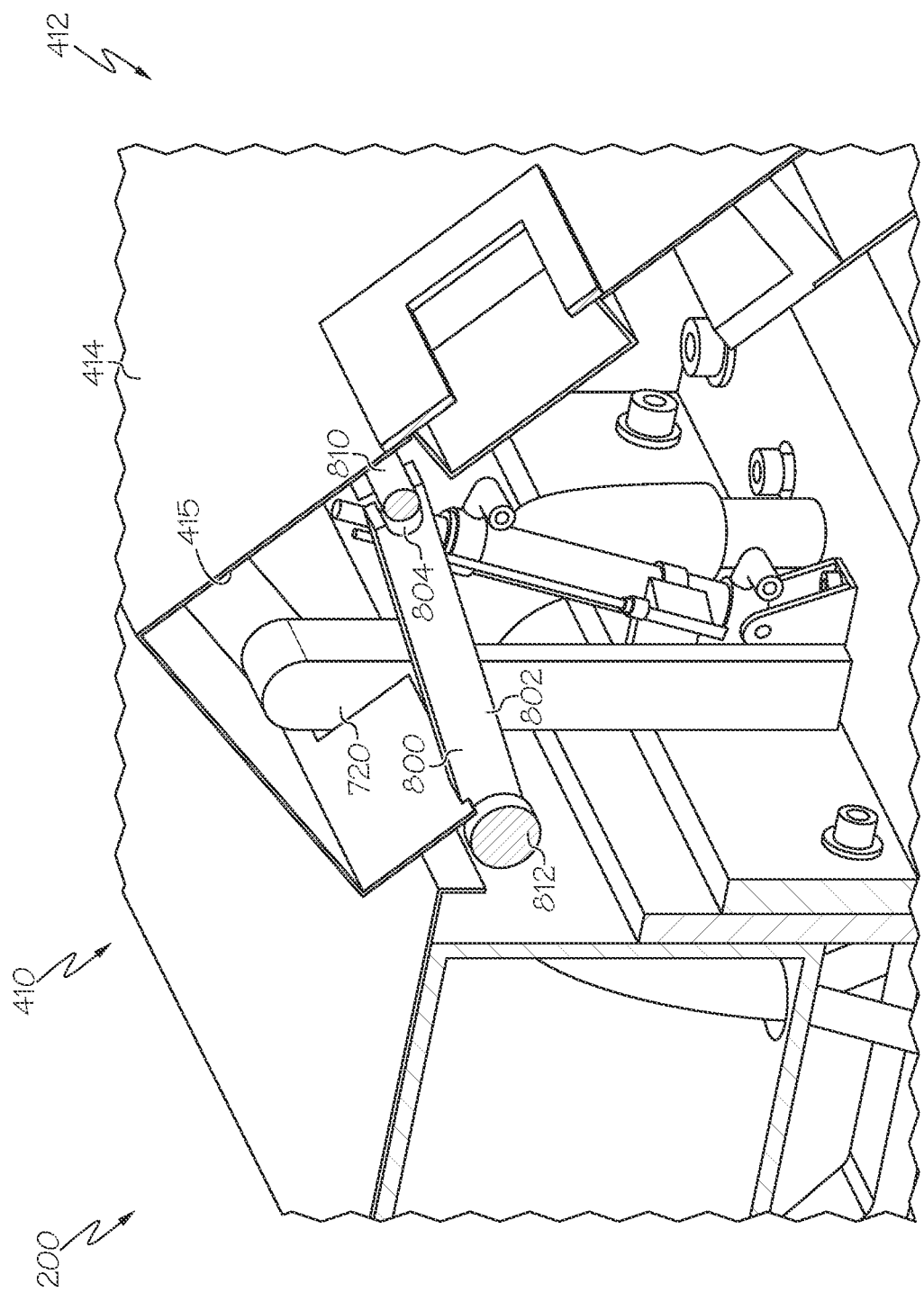
FIG. 8 schematically depicts a section view of a recoat assembly in an open configuration according to one or more embodiments shown and described herein.

FIG. 8 depicts an embodiment of the recoat assembly 200 that includes a locking bar 800 in lieu of the lift assist arm 740 depicted in FIGS. 6 and 7. Referring to FIG. 8, in conjunction with FIGS. 4-7, a first end 802 of the locking bar 800 is pivotally coupled to the first portion 410 of the recoat assembly 200. The first end 802 of the locking bar 800 may be pivotally coupled to a horizontal support arm 812 positioned along the second base frame 606. A second end 804 of the locking bar 800 is selectively couplable to the second portion 412 of the recoat assembly 200 when the second portion 412 of the recoat assembly 200 is in the open configuration as shown in FIG. 8. The second end 804 of the locking bar 802 is selectively couplable to a rod 810 positioned along the interior surface 415 of the shield 414. That is, the second end 804 of the locking bar 802 is a free end that can be engaged with the rod 810. After the second portion 412 is pneumatically or manually pivoted to the second open configuration, a user may rotate the locking bar 800 about the horizontal support arm 812 and couple the second end 804 of the locking bar 800 with the rod 810. In such cases, the locking bar 800 may lock the second portion 412 in the open configuration as an additional measure to ensure the second portion 412 does not fall on a user servicing the roller 420, for instance.

In operation, the recoat assemblies described herein facilitate access to the roller. In some embodiments, a method of accessing the roller of the recoat assembly includes pivoting the second portion of the recoat assembly with respect to the first portion of the recoat assembly from a first position to a second position to expose the roller from within the powder containment section, as described herein. In some aspects, the method further includes moving the recoat assembly to an access position in a build chamber prior to pivoting the second portion. That is, the recoat assembly may be moved to a location such as, for example, the home region 148 depicted in FIG. 1. Such a moving step may include driving the recoat assembly along a first guide at a first longitudinal edge of the recoat assembly by a transverse actuator as described herein, as well as guiding the recoat assembly along a second guide at a second longitudinal edge of the recoat assembly. In some aspects, pivoting the second portion includes pneumatically or manually actuating the second portion about a pivot point, as described herein with respect to FIGS. 6-7. In some aspects, the method may further include pivoting a locking bar to engage a free end of the locking bar with the second portion of the recoat assembly, as described herein with respect to FIG. 8.

It should now be understood that that the devices, systems, and methods described herein provide recoat assemblies having rollers located within a power containment section to reduce powder contamination. To access the roller, select portions of the recoat assembly are pivotable to expose the roller within the powder containment section. However, to enhance repeatability, certain components of the recoat assembly, such as the roller, are not pivotable and remain in place when the roller is exposed. Moreover, the certain components of the recoat assembly may only be movable along one coordinate axis, thereby increasing stability and repeatability in build processes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A recoat assembly, comprising: a first portion comprising a roller; and a second portion pivotally coupled to the first portion and pivotable with respect to the first portion from a first position to a second position, wherein: the roller is enclosed in a powder containment section when the second portion is in the first position; and the roller is exposed when the second portion is in the second position.

2. The recoat assembly according to the preceding clause, wherein the powder containment section comprises: an inner shroud having a first end and a second end, wherein: the first end and the second end are adjacent opposite sides of the roller; and the inner shroud at least partially surrounds the roller; a first outer shroud wall nearest to a first end of the inner shroud; and a second outer shroud wall nearest to a second end of the inner shroud opposite the first end of the inner shroud.

3. The recoat assembly according to any preceding clause, wherein: the first portion of the recoat assembly further comprises: a first segment of the inner shroud; and the first outer shroud wall nearest to the first end of the inner shroud; and the second portion of the recoat assembly further comprises: a second segment of the inner shroud; and the second outer shroud wall nearest to the second end of the inner shroud.

4. The recoat assembly according to any preceding clause, wherein: the recoat assembly further comprises: a first longitudinal edge; a transverse actuator at the first longitudinal edge of the recoat assembly, wherein the transverse actuator is coupled to a first guide; and a second longitudinal edge, wherein the second longitudinal edge of the recoat assembly is attached to a second guide.

5. The recoat assembly according to any preceding clause, wherein the second portion comprises a powder plow.

6. The recoat assembly according to any preceding clause, further comprising a pneumatic actuator configured to pivot the second portion with respect to the first portion.

7. The recoat assembly according to any preceding clause, wherein: the pneumatic actuator is fixedly coupled to a support arm of the second portion; and the support arm of the second portion is pivotally coupled to a support arm of the first portion.

8. The recoat assembly according to any preceding clause, further comprising a lift assist, wherein: a first end of the lift assist is pivotally coupled to the first portion of the recoat assembly; a second end of the lift assist is pivotally coupled to the second portion of the recoat assembly; and the lift assist biases the second portion of the recoat assembly to the second position.

9. The recoat assembly according to any preceding clause, further comprising a locking bar, wherein: a first end of the locking bar is pivotally coupled to the first portion of the recoat assembly; a second end of the locking bar is selectively coupleable to the second portion of the recoat assembly when the second portion of the recoat assembly is in the second position; and the locking bar maintains the second portion in the second position when the second end of the locking bar is coupled to the second portion.

10. An additive manufacturing system, comprising: a recoat assembly, comprising: a first portion comprising a roller; and a second portion pivotally coupled to the first portion and pivotable with respect to the first portion from a first position to a second position to selectively expose the roller from within a powder containment section.

11. The additive manufacturing system according to the preceding clause, wherein the powder containment section comprises: an inner shroud having a first end and a second end, wherein: the first end and the second end are adjacent opposite sides of the roller; and the inner shroud at least partially surrounds the roller; a first outer shroud wall; and a second outer shroud wall, wherein the inner shroud is positioned between the first outer shroud wall and the second outer shroud wall.

12. The additive manufacturing system according to any preceding clause, wherein: the first portion of the recoat assembly further comprises: a first segment of the inner shroud; and the first outer shroud wall; and the second portion of the recoat assembly further comprises: a second segment of the inner shroud; and the second outer shroud wall.

13. The additive manufacturing system according to any preceding clause, further comprising: a first guide; and a second guide, wherein: the recoat assembly further comprises: a first longitudinal edge; a transverse actuator at the first longitudinal edge of the recoat assembly, wherein the transverse actuator is coupled to the first guide; and a second longitudinal edge, wherein the second longitudinal edge of the recoat assembly is attached to the second guide.

14. The additive manufacturing system according to any preceding clause, wherein the recoat assembly further comprises a pneumatic actuator fixedly coupled to a support arm of the second portion, wherein the support arm of the second portion is pivotally coupled to a support arm of the first portion.

15. A method of accessing a roller of a recoat assembly, comprising: pivoting a second portion of the recoat assembly with respect to a first portion of the recoat assembly, from a first position to a second position, wherein: the first portion comprises the roller; and the pivoting exposes the roller from within a powder containment section of the recoat assembly.

16. The method according to the preceding clause, further comprising moving the recoat assembly to an access position in a build chamber prior to pivoting the second portion.

17. The method according to any preceding clause, wherein moving the recoat assembly to the access position further comprises: driving the recoat assembly along a first guide at a first longitudinal edge of the recoat assembly by a transverse actuator; and guiding the recoat assembly along a second guide at a second longitudinal edge of the recoat assembly.

18. The method according to any preceding clause, wherein pivoting the second portion further comprises pneumatically actuating the second portion about a pivot point.

19. The method according to any preceding clause, wherein pivoting the second portion further comprises manually actuating the second portion about a pivot point.

20. The method according to any preceding clause, further comprising pivoting a locking bar coupled to the first portion of the recoat assembly to engage a free end of the locking bar with the second portion of the recoat assembly, wherein engaging the free end of the locking bar with the second portion of the recoat assembly maintains the second portion in the second position.

What is claimed is:

1. A recoat assembly for an additive manufacturing system, comprising:
    a first encasement portion comprising a roller to contact, move, spread, and/or smooth a build material; and
    a second encasement portion pivotally coupled to the first encasement portion and pivotable with respect to the first encasement portion from a first position to a second position, an internal cavity of the second encasement portion defined in part by a base frame of the first encasement portion, wherein:
    the roller is enclosed in a powder containment section of the recoat assembly when the second encasement portion is in the first position; and
    a rotating surface of the roller is exposed when the second encasement portion pivots away from the base frame of the first encasement portion to the second position.

2. The recoat assembly of claim 1, wherein the powder containment section comprises:
    an inner shroud having a first end and a second end, wherein:
        the first end and the second end are respectively adjacent opposite sides of the roller; and
        the inner shroud at least partially surrounds the roller;
    a first outer shroud wall nearest to the first end of the inner shroud; and
    a second outer shroud wall nearest to the second end of the inner shroud.

3. The recoat assembly of claim 2, wherein:
the first encasement portion of the recoat assembly further comprises:
a first segment of the inner shroud; and
the first outer shroud wall nearest to the first end of the inner shroud; and
the second encasement portion of the recoat assembly further comprises:
a second segment of the inner shroud; and
the second outer shroud wall nearest to the second end of the inner shroud.

4. The recoat assembly of claim 1, wherein:
the recoat assembly further comprises:
a first longitudinal edge;
a transverse actuator at the first longitudinal edge of the recoat assembly, wherein the transverse actuator is coupled to a first guide; and
a second longitudinal edge, wherein the second longitudinal edge of the recoat assembly is attached to a second guide.

5. The recoat assembly of claim 1, wherein the second encasement portion comprises a powder plow.

6. The recoat assembly of claim 1, further comprising a pneumatic actuator configured to pivot the second encasement portion with respect to the first encasement portion.

7. The recoat assembly of claim 6, wherein:
the pneumatic actuator is fixedly coupled to a support arm of the second encasement portion; and
the support arm of the second encasement portion is pivotally coupled to a support arm of the first encasement portion.

8. The recoat assembly of claim 1, further comprising a lift assist, wherein:
a first end of the lift assist is pivotally coupled to the first encasement portion of the recoat assembly;
a second end of the lift assist is pivotally coupled to the second encasement portion of the recoat assembly; and
the lift assist biases the second encasement portion of the recoat assembly to the second position.

9. The recoat assembly of claim 1, further comprising a locking bar, wherein:
a first end of the locking bar is pivotally coupled to the first encasement portion of the recoat assembly;
a second end of the locking bar is selectively couplable to the second encasement portion of the recoat assembly when the second encasement portion of the recoat assembly is in the second position; and
the locking bar maintains the second encasement portion in the second position when the second end of the locking bar is coupled to the second encasement portion.

10. An additive manufacturing system comprising the recoat assembly of claim 1.

11. The additive manufacturing system of claim 10, wherein the powder containment section comprises:
an inner shroud having a first end and a second end, wherein:
the first end and the second end are respectively adjacent opposite sides of the roller; and
the inner shroud at least partially surrounds the roller;
a first outer shroud wall; and
a second outer shroud wall, wherein the inner shroud is positioned between the first outer shroud wall and the second outer shroud wall.

12. The additive manufacturing system of claim 11, wherein:
the first encasement portion of the recoat assembly further comprises:
a first segment of the inner shroud; and
the first outer shroud wall; and
the second encasement portion of the recoat assembly further comprises:
a second segment of the inner shroud; and
the second outer shroud wall.

13. The additive manufacturing system of claim 10, further comprising:
a first guide; and
a second guide, wherein:
the recoat assembly further comprises:
a first longitudinal edge;
a transverse actuator at the first longitudinal edge of the recoat assembly, wherein the transverse actuator is coupled to the first guide; and
a second longitudinal edge, wherein the second longitudinal edge of the recoat assembly is attached to the second guide.

14. The additive manufacturing system of claim 10, wherein the recoat assembly further comprises a pneumatic actuator fixedly coupled to a support arm of the second encasement portion, wherein the support arm of the second encasement portion is pivotally coupled to a support arm of the first encasement portion.

15. A method of accessing the roller of the recoat assembly of claim 1, comprising:
pivoting the second encasement portion of the recoat assembly with respect to the first encasement portion of the recoat assembly, from the first position to the second position.

16. The method of claim 15, further comprising moving the recoat assembly to an access position in a build chamber prior to pivoting the second encasement portion.

17. The method of claim 16, wherein moving the recoat assembly to the access position further comprises:
driving the recoat assembly along a first guide at a first longitudinal edge of the recoat assembly by a transverse actuator; and
guiding the recoat assembly along a second guide at a second longitudinal edge of the recoat assembly.

18. The method of claim 15, wherein pivoting the second encasement portion further comprises pneumatically actuating the second encasement portion about a pivot point.

19. The method of claim 15, wherein pivoting the second encasement portion further comprises manually actuating the second encasement portion about a pivot point.

20. The method of claim 15, further comprising pivoting a locking bar coupled to the first encasement portion of the recoat assembly to engage a free end of the locking bar with the second encasement portion of the recoat assembly, wherein engaging the free end of the locking bar with the second encasement portion of the recoat assembly maintains the second encasement portion in the second position.

* * * * *